United States Patent [19]

Blum et al.

[11] 4,103,405
[45] Aug. 1, 1978

[54] TOOL CHANGING ARRANGEMENT

[75] Inventors: Günther Blum, Gullen, Rauensburg; Gerhard Stark, Notzingen, both of Fed. Rep. of Germany

[73] Assignee: Stama Stark Maschinenfabrik Gotthilf Stark, Schlierbach, Fed. Rep. of Germany

[21] Appl. No.: 695,654

[22] Filed: Jun. 14, 1976

[30] Foreign Application Priority Data

Jun. 16, 1975 [DE] Fed. Rep. of Germany ....... 2526902

[51] Int. Cl.² .......................................... B23Q 3/155
[52] U.S. Cl. .................... 29/26 A; 29/568; 408/35
[58] Field of Search ............ 29/26 A, 56 R; 90/11 D, 90/11 A; 408/35, 239, 239 A; 83/549, 552, 563

[56] References Cited

U.S. PATENT DOCUMENTS

| 3,413,702 | 12/1968 | Bury | 408/35 |
|---|---|---|---|
| 3,466,739 | 9/1969 | Harman | 29/568 |
| 3,490,333 | 1/1970 | Scruton | 90/11 A |
| 3,628,231 | 12/1971 | Pancook | 29/568 X |
| 3,797,956 | 3/1974 | Bayer et al. | 408/35 |
| 3,807,011 | 4/1974 | Harman et al. | 29/568 |
| 3,893,371 | 7/1975 | Frazier | 408/239 |

*Primary Examiner*—Othell M. Simpson
*Assistant Examiner*—Z. R. Bilinsky
*Attorney, Agent, or Firm*—Michael J. Striker

[57] ABSTRACT

A tool changing arrangement for a machine tool comprises a rotary and axially movable drive spindle which coaxially carries a holding member rotatable therewith and movable in axial direction relative thereto. A tool carrier movable transversely to the holding member is provided at one end with a T-shaped slot into which a corresponding male portion on the holding member may be engaged, to couple the tool carrier to the holding member. The spindle and the tool carrier are provided at facing ends with interengaging centralizing portions which during axial movement of the holding member relative to the spindle axially align the tool carrier and the spindle.

21 Claims, 10 Drawing Figures

TOOL CHANGING ARRANGEMENT

BACKGROUND OF THE INVENTION

The present invention relates to a tool changing arrangement for a machine tool comprising an axially advanceable drive spindle provided with a holding member having a receiving part into which a tool carrier may be pushed laterally and be held thereon substantially coaxial with the spindle, and in which the drive spindle and the tool carrier are provided at facing ends thereof with centralizing parts which, during the coupling of the two members and relative movement between the drive spindle and the holding member axially align the drive spindle and the tool carrier. The arrangement includes further parts for transmitting a turning moment from the drive spindle to the tool carrier.

In a known arrangement of the aforementioned kind, the holding member is in the form of tongs located outside the spindle and movable with the same in axial direction, but not turnable relative thereto. The tool carrier must therefore be supported in a special way with respect to the holding member. The tool carrier is provided with a steep cone extending into a corresponding internal conical surface of the drive spindle to axially align these two elements with respect to each other. In order to transmit a turning moment from the spindle to the tool carrier, the spindle has to be provided with separate elements which enter into the steep cone of the tool carrier. Wear of the inter-engaging elements is thereby unavoidable, which will lead to an undesired chatter of the tool carrier and the tool carried thereby. The holding member located outside of the spindle, and hydraulically moved in axial direction relative thereto, requires considerable space and is necessarily complicated in construction. The steep cone requires a large stroke for engagement with the internal cone surface and the interengaging surfaces have to be manufactured to very close tolerances, while still not providing a perfect axial alignment of the two members. Furthermore, each tool carrier requires an expensive bearing. The tool carriers form with different tools respectively a unit, which during machining of a workpiece must usually be changed several times.

SUMMARY OF THE INVENTION

It is an object of the present invention to provide a tool changing arrangement which overcomes the abovementioned disadvantages of such arrangements known in the art.

It is a further object of the present invention to provide a tool changing arrangement of the aforementioned kind which is of simple and compact construction, not requiring expensive bearings for the tool carrier, which provides secure means for transmitting a turning moment from the spindle to the tool carrier, which are not subjected to undue wear, and which will assure an exact and stiff alignment of the axes of spindle and tool carrier to resist axial as well as radial forces, and which, especially by automatic tool changing arrangements, permits a quick change and connection of successive tool carriers with the spindle.

With these and other objects in view, which will become apparent as the description proceeds, the tool changing arrangement according to the present invention mainly comprises a rotary drive spindle movable in axial direction between two end positions, a holding member coaxially carried by the spindle for rotation therewith and axially movable with respect thereto and having a tool carrier receiving part projecting beyond one end of the spindle, a tool carrier movable transversely to the holding member and having at one end facing the one end of the spindle a portion in which the tool carrier receiving part is inserted, when the tool holder and the spindle are substantially aligned in axial direction. The spindle and the tool carrier having at the facing ends thereof interengaging centralizing portions which, during axial movement of the holding member relative to the spindle, axially align the tool carrier and the spindle. Furthermore, the aforementioned receiving part of the holding member and the portion of the tool carrier, in which the receiving part is engaged, are provided with cooperating engaging faces for transmitting a turning moment from the spindle to the tool carrier. The receiving part of the holding member preferably comprises a crossbar extending transversely to the axis of the holding member and the portion of the tool carrier is provided with a slot for receiving the crossbar. The slot and the crossbar are further provided with faces through which forces in axial direction may be transmitted between the holding member and the tool carrier. The slot and the tool carrier receiving part are preferably of T-shaped cross section which has special advantages with regard to the manufacture and the rigidity of the arrangement.

A stationary abutment means is further provided for limiting axial movement of the holding member in one direction relative to the spindle to a position in which the tool carrier may be moved onto the holding member, respectively removed therefrom, and the drive spindle has in one of its end positions a predetermined distance from the abutment means, so that the relative axial movement of drive spindle and holding member in this end position is fixed and large enough to release parts of the tool carrier which are in the coupled condition inserted in the spindle. In order to pull the facing ends of the drive spindle and the tool carrier forcefully against each other, an energy storage is provided between the drive spindle and the holding member which, during relative movement of the drive spindle and the holding member changes its characteristic. An especially simple and properly functioning construction is derived when the energy storing means are in the form of a pack of dished spring washers held between the drive spindle and the holding member.

According to the present invention the centralizing portions of the drive spindle and the tool carrier are constituted by short interengaging cones, and at least the cone on the tool carrier is divided by cutouts into a plurality of sectors. The facing ends of the drive spindle and the tool carrier are further provided, in addition to the short cones, with contact faces to transmit axial forces between the two members. The tool carrier has elastic zones arranged so that the cone sectors, during relative movement between drive spindle and holding member, may be spread apart, when the contact faces of drive spindle and tool carrier abut against each other. In this way, the relative movement between drive spindle and holding member can be held relatively short, the interengaging cones and the position of the contact faces relative thereto may be manufactured at relatively large tolerances, while obtaining a definite axial position of the tool carrier and the drive spindle relative to each other. The unstressed position there is a small clearance between the two cones and, under the pulling force imparted to the holding member, the sectors of the cone of the tool carrier are spread apart to assure thereby a central engagement of the two cones without any play with respect to each other. An exact machining of the short cones and the contact surfaces will assure a central and axial exact connecting of the various members to each other. The tool carrier will be supported in exact axial position and perfectly central with the drive spindle, during rough machining or fine machining of the workpiece, regardless of the feeding speed, the number of revolutions and the loads applied to the tool.

The arrangement according to the present invention is especially advantageous in a machine tool with an automatic tool changing arrangement provided with a magazine, in which the tool carriers are arranged on a rail movable by a transporting system, and in which the rail, at the point of intersection with the drive spindle and at a loading station, is interrupted and in which the holding member at the interruption at the fore-mentioned point of intersection takes over the function of the rail. According to the invention the drive spindle with the holding member is arrestable in an axial end position of the spindle in such a manner that the receiving part of the holding member is exactly oriented to be aligned with the rail. The tool carrier can thereby not only without difficulties move onto the holding member, respectively be removed therefrom, but the positioning thereof can as a rule, in NC (numerically controlled) machine tools, carried out in such a manner that grooves on the workpiece during retraction of the tool can be avoided. Various possibilities for arresting the drive spindle and the holding member thereon in an exactly defined angular position are well known in the art. For transporting the tool carrier on the rail, push cylinders, transport wheels, chains, Maltese crosses or similar known arrangements may be used. Gripping systems are unnecessary, since even the release of the tool carrier from the holding member may be carried out automatically through axial movement of the holding member, respectively the drive spindle. The transport system need not exactly position the tool carrier, since the short cone will provide for a precentralizing of the same. If the rail in the magazine forms a circular path, the receiving part for the tool carrier on the holding member is preferably formed along a circular arc with the profiles of the rail and the receiving part of the holding member corresponding to each other.

The tool carrier provided with the necessary tool is moved, during tool change, radially with respect to the drive spindle onto the holding member, until the axes of drive spindle and tool carrier are substantially aligned. Subsequently thereto, the holding member is moved by means of the energy storing means in axial direction relative to the drive spindle until the contact surface of the tool carrier abuts against the contact surface of the drive spindle and the spread cone sections on the tool carrier abut tightly against the inner cone of the drive spindle. The connection between tool carrier and spindle is thus carried out without delay during the necessary fast advance of the spindle. On the other hand, at the end of the fast return of the spindle, the tool carrier is disconnected from the latter so that the transporting system can move the tool carrier out of the holding member. Due to the abutment of the contact surfaces, the axial stiffness and position of the arrangement is assured and the degree of stiffness is determined by the forces developed by the energy storing means. The magazine mounted on the spindle carrier head may contain 15 to 30 tool carriers. The time for selection of a tool carrier with a specific tool thereon may be shortened by an appropriate coding of the sequence in which the various tool carriers are arranged in the magazine. The automatic tool change requires only a time of about one second and the time in which a new tool can be brought in engagement with the workpiece is about 3 seconds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
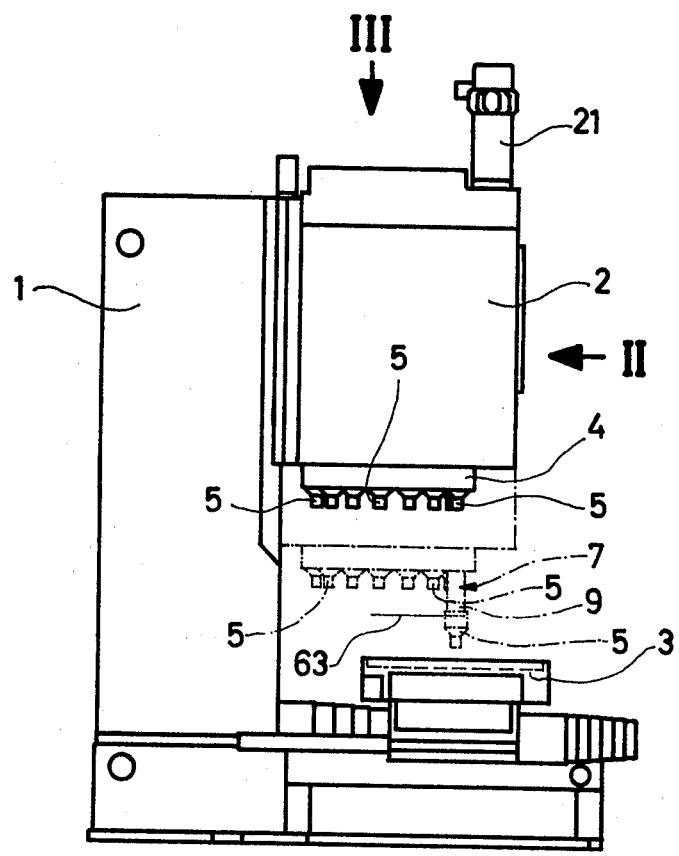
FIG. 1 is a schematic side view of a machine tool provided with the tool changing arrangement according to the present invention.
Figure 2:
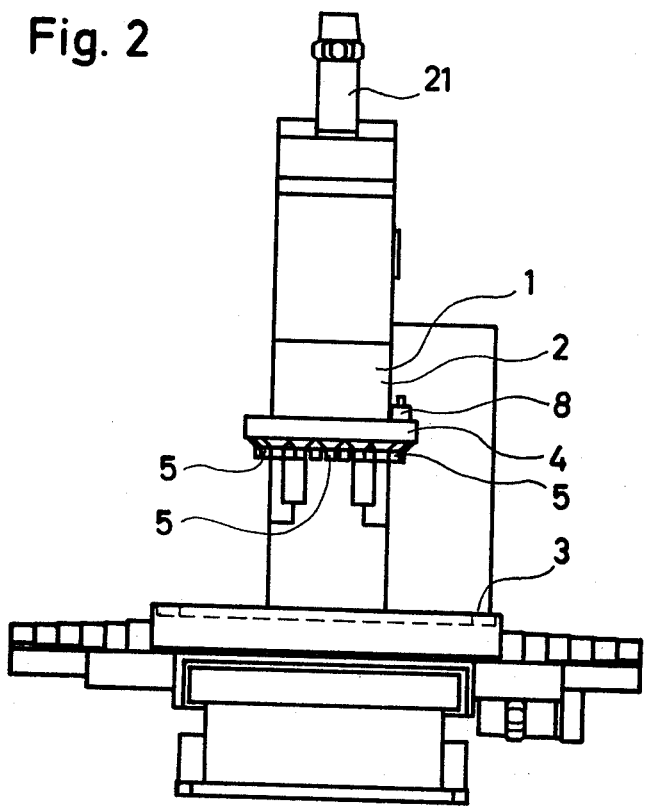
FIG. 2 is a front view of the machine tool shown in FIG. 2 viewed in the direction of the arrow II of FIG. 1.
Figure 3:
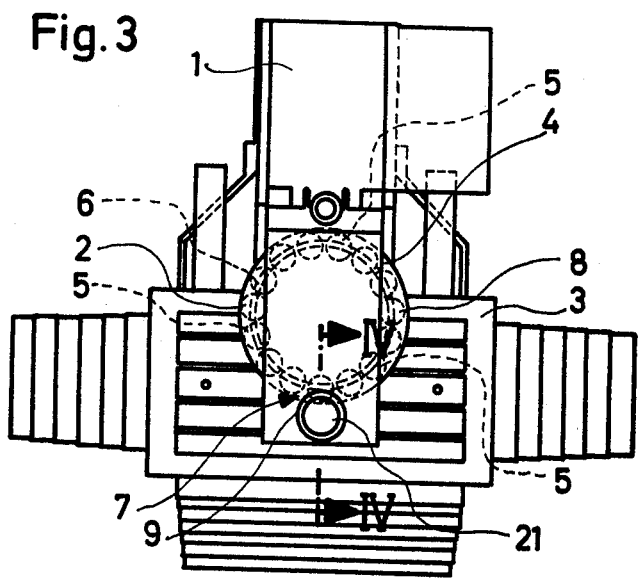
FIG. 3 is a top view of the machine tool shown in FIG. 1, as viewed in the direction of the arrow III in FIG. 1.
Figure 4:
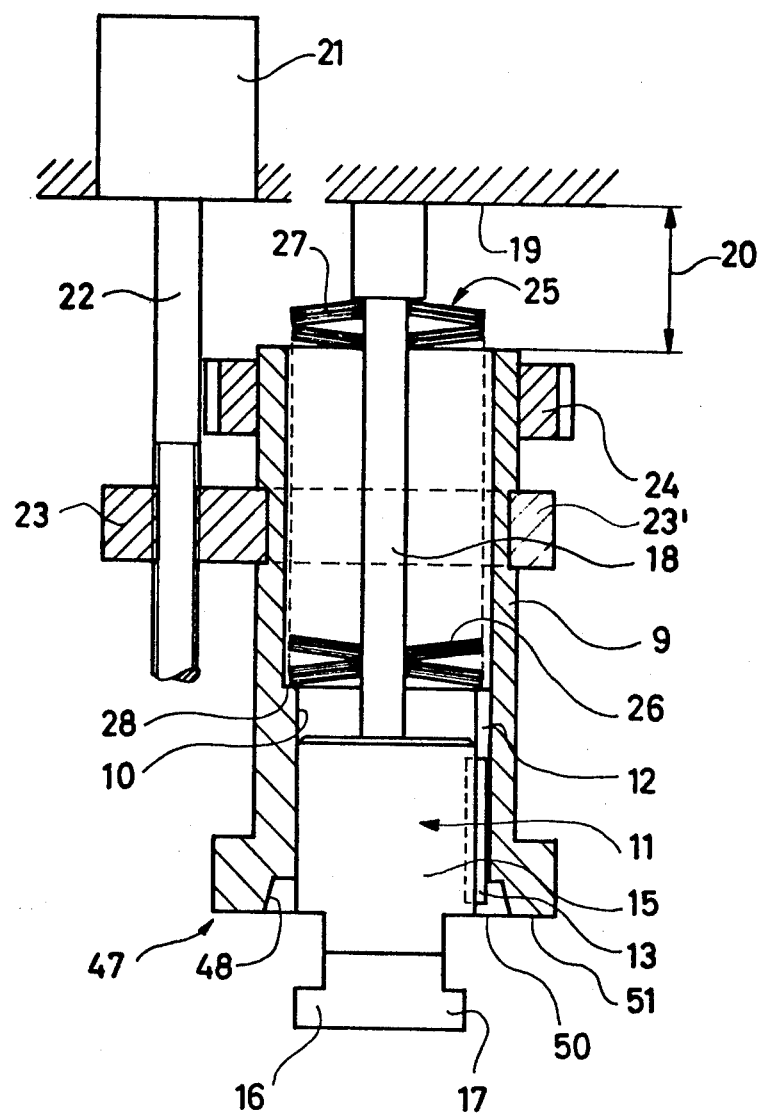
FIG. 4 is a cross section through the drive spindle according to line IV—IV in FIG. 3 and showing the arrangement schematically and to a large scale than in FIG. 3.

The machine tool schematically illustrated in FIG. 1 comprises an upright support 1 on which a spindle head 2 is reciprocable in vertical direction. A table 3 has an upper surface of about 1250 × 600 mm, on which the workpiece to be machined is to be mounted, and a static loadability of maximum 3000 kp. The table is movable in the usual manner along two coordinates which are normal to each other. A magazine 4, in which for instance 15 to 30 tool carriers 5 are arranged, is mounted on the bottom face of the spindle carrier 2. The tool carriers 5 are suspended on a circular rail 6 and are movable along the latter by a non-illustrated transport system, for instance a Maltese cross, to a working station 7 after the tool carriers have been moved at a loading station 8 into the magazine 4. At the working station 7 the tool carriers 5 are connectable with a hydrostatically mounted drive spindle 9. The drive spindle 9 is exactly mounted and may be driven at greatly varying speeds, for instance with 28 to 5600 rpm, so that the workpiece may be exactly machined regardless whether the workpiece is drilled, turned or provided with a thread. An arresting arrangement is provided for the drive spindle 9 in which the latter, in one of its axial end positions, as shown in FIG. 4, is arrested in a position in which the spindle has with respect to fixed points of the machine tool always the same distance and the same angular position. This arresting arrangement can be carried out in various ways and it does not form part of the present invention. All machine functions can be controlled by a three axis system in proper manner.

The drive spindle 9 is in tubular form and, as shown in FIG. 4, a holding member 11 is received in the bore 10 of the drive spindle and connected to the latter for rotation therewith by a key 13, fixed to the holding member 11 and engaging in a groove 12 of the spindle 9. This key and groove arrangement permits movement of the holding member 11 relative to the spindle in the direction of the axis 14 of the latter. The holding member 11 has substantially the form of an anchor and a crossbar 16, of a profile in form of an inverted T connected to the lower end of the cylindrical anchor shaft 15, serves as a receiving part 17 for a tool carrier 5. This receiving part 17 forms, in the region of the working station 7 in one end position of the holding member 11, respectively the drive spindle 9, part of the rail 6, that is, due to the arresting of the spindle 9 in a specific axial and angular position, the receiving part 17 is at the same level as the rail 6 and aligned with the latter. A bolt-shaped extension 18 projects from the end of the holding member, opposite the end on which the receiving part 17 is provided, and this extension 18 abuts in an axial end position of the holding member 11 against a fixed abutment 19 to thereby arrest the receiving part 17 in an exact axial position corresponding to the elevation of the rail 6. In this end position, the spindle 9 has a predetermined distance 20 from the abutment 19. Axial movement of the drive spindle 9 is carried out by means of a screw spindle 22, driven by a motor 21, and meshing with a nut 23 projecting laterally from an annular member 23', which in turn is mounted in an annular groove provided in the drive spindle 9, so that the annular member 23' and the nut 23 is axially fixed to the drive spindle 9, while the latter may rotate relative to the annular member 23'. The spindle 9 is driven about its axis by a gear 24 fixed thereto, which in turn is driven in a known manner, not shown in the drawing by a further drive mechanism. Energy storing means 25 are provided between the holding member 11 and the drive spindle 9 and this energy storing means 25 is preferably constituted by a pack of cup-shaped spring washers 26 which engages with one end of a stop 27 provided on the upper end of the bolt-shaped extension 18 and with its other end a shoulder 28 provided in the bore of the spindle 9. The pack of spring washers 26 is under pretension of about 1500 kp and the holding member 11 is drawn into the bore 10 of the drive spindle 9 with a corresponding force, when the bolt-shaped extension 18 is disassociated from the fixed abutment 19.

The tool carrier 5 (FIG. 5) is provided with a T-shaped groove, extending from the upper surface of the tool carrier into the latter. The groove has a profile which corresponds to the profile of the receiving part 17 of the holding member so that the tool carrier may be moved laterally, that is normal to the drive spindle axis 14, onto the part 17 of the holding member 11. Thereby, the tool carrier 5 abuts with a surface 31 onto a corresponding surface 32 of the part 17 and the side faces of the part 17 constitute turning moment transmitting faces 33 which cooperate with corresponding turning moment transmitting faces 34 on the tool carrier 5. The holding member 11 constitutes thereby a turning moment transmitting part 35 and the turning moment imparted to the drive spindle 9 is transmitted through the key 12 respectively the groove 13 onto the holding member 11 and from the latter over the turning moment transmitting faces 33, 34 onto the tool carrier 5.

Figure 6:
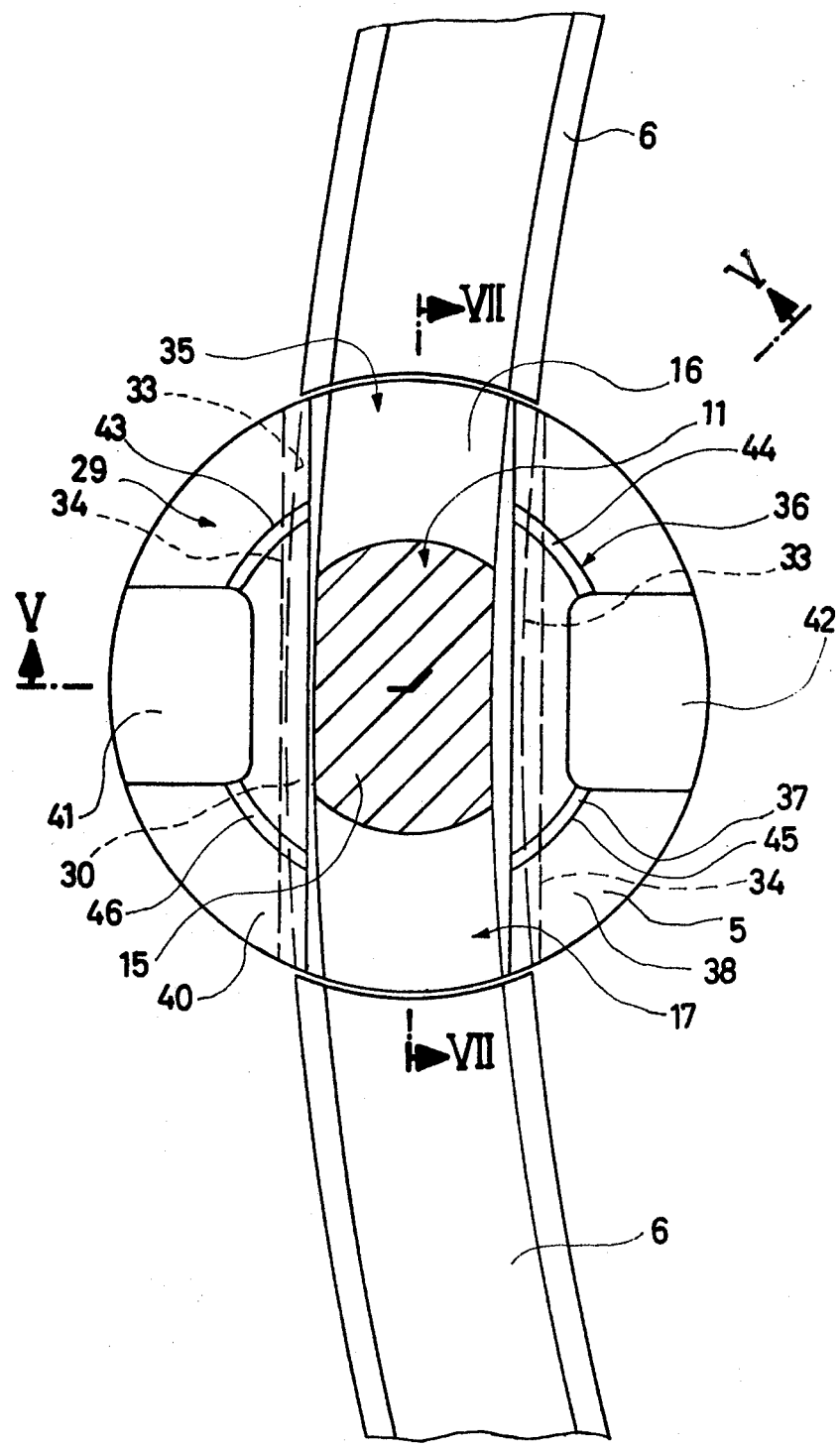
FIG. 6 is a cross section taken along the line VI—VI of FIG. 5.
Figure 7:
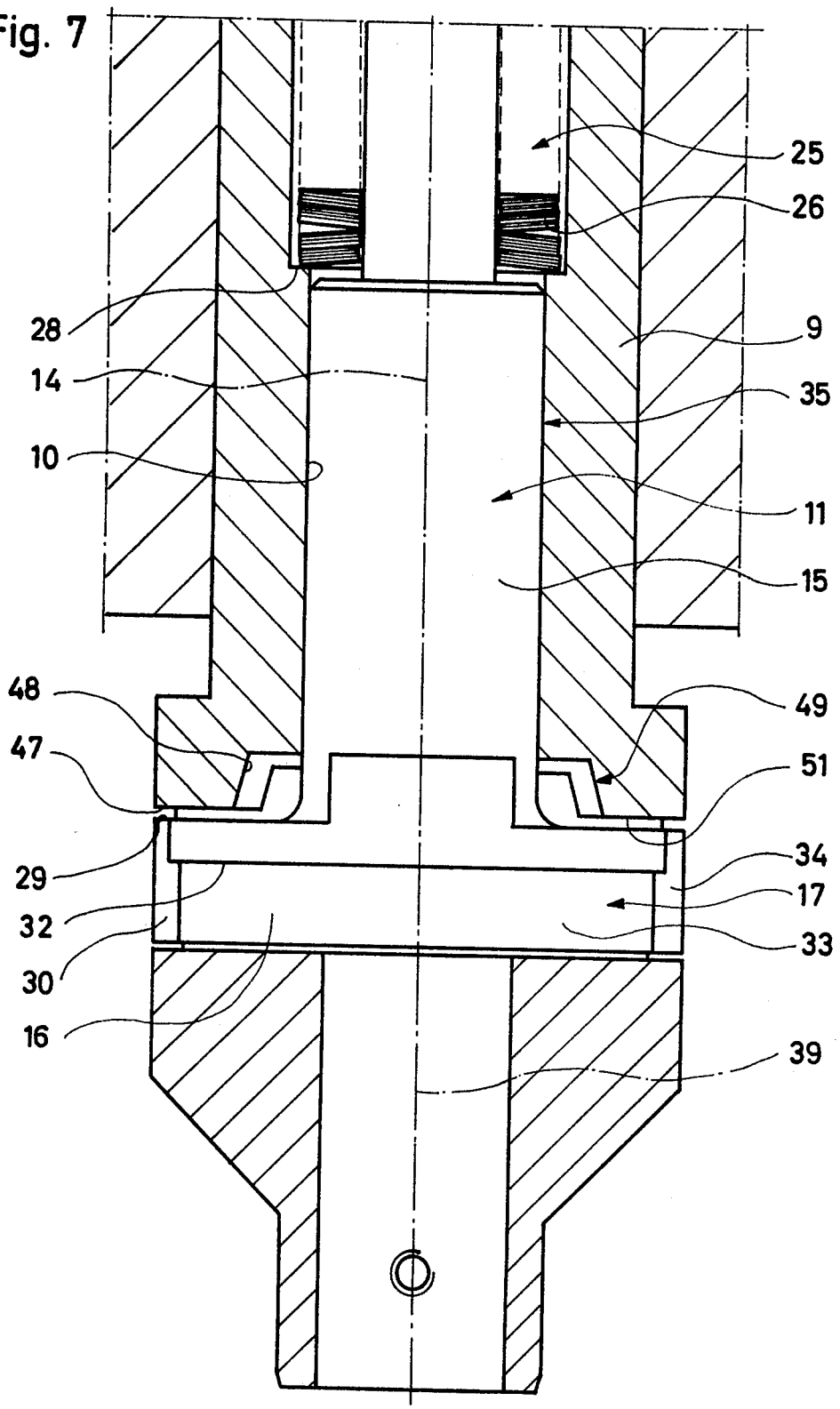
FIG. 7 is a cross section taken along the line VII—VII of FIG. 6.
Figure 8:
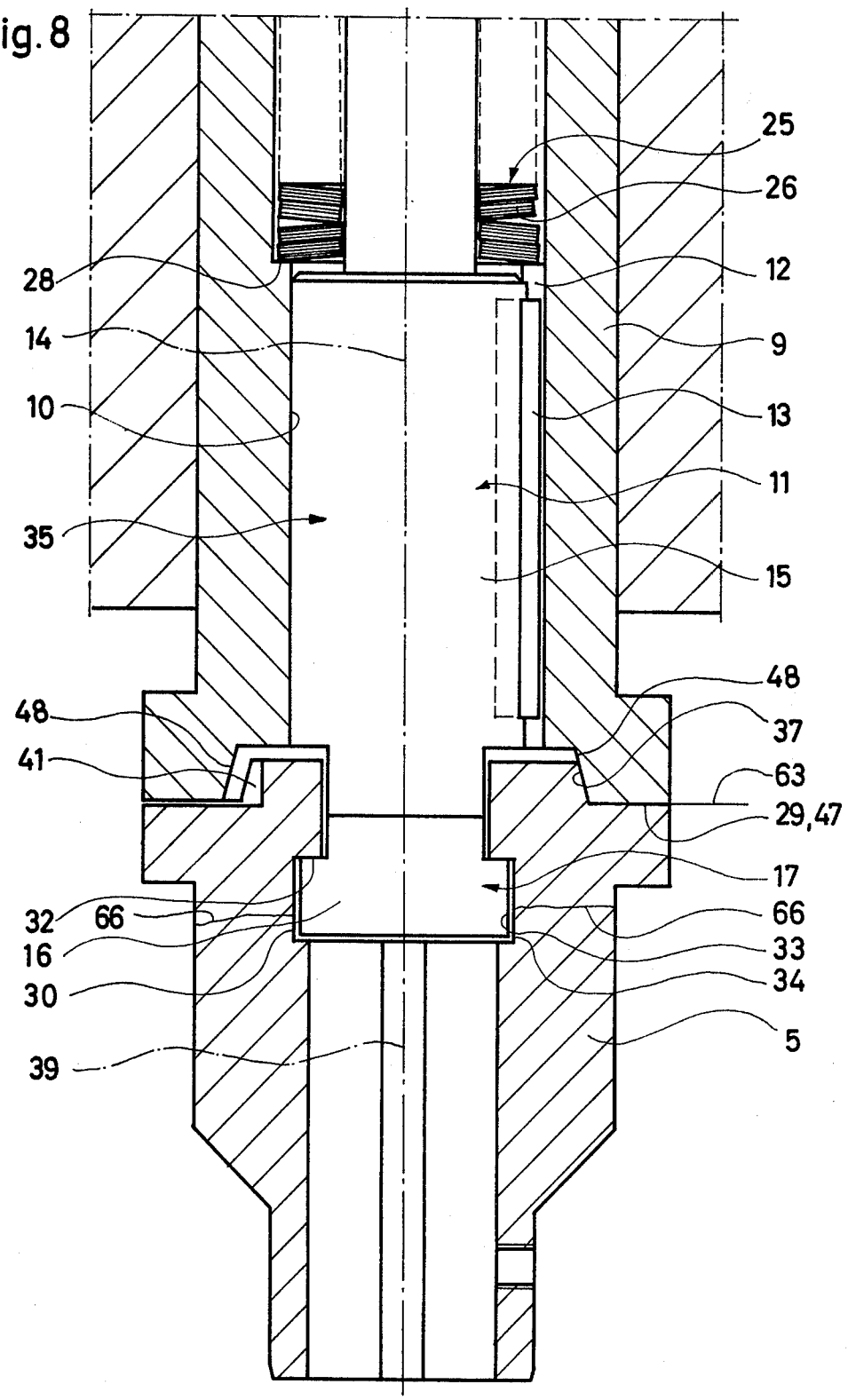
FIG. 8 is a cross section corresponding to that shown in FIG. 5, after coupling of drive spindle and tool carrier with each other.

The end face 29 of the tool carrier 5 carries a centralizing part 36 in form of a short cone 37, which is surrounded by a contact surface 38 extending normal to the tool carrier axis 39 and forming an annular surface 40. The short cone 37, as well as the annular surface 40, are interrupted by a groove 30 and by two opposite cutouts 41, 42 (FIG. 6), so that the short cone 34 is divided into four sectors 43–46.

The drive spindle 9 is likewise provided with an internal short cone 48 extending from the end face 47 into the spindle and serving as a centralizing part 49, and the conical surface is again surrounded by a contact face 50, constituted by a planar annular surface 51 normal to the axis 14 of the spindle.

Figure 9:
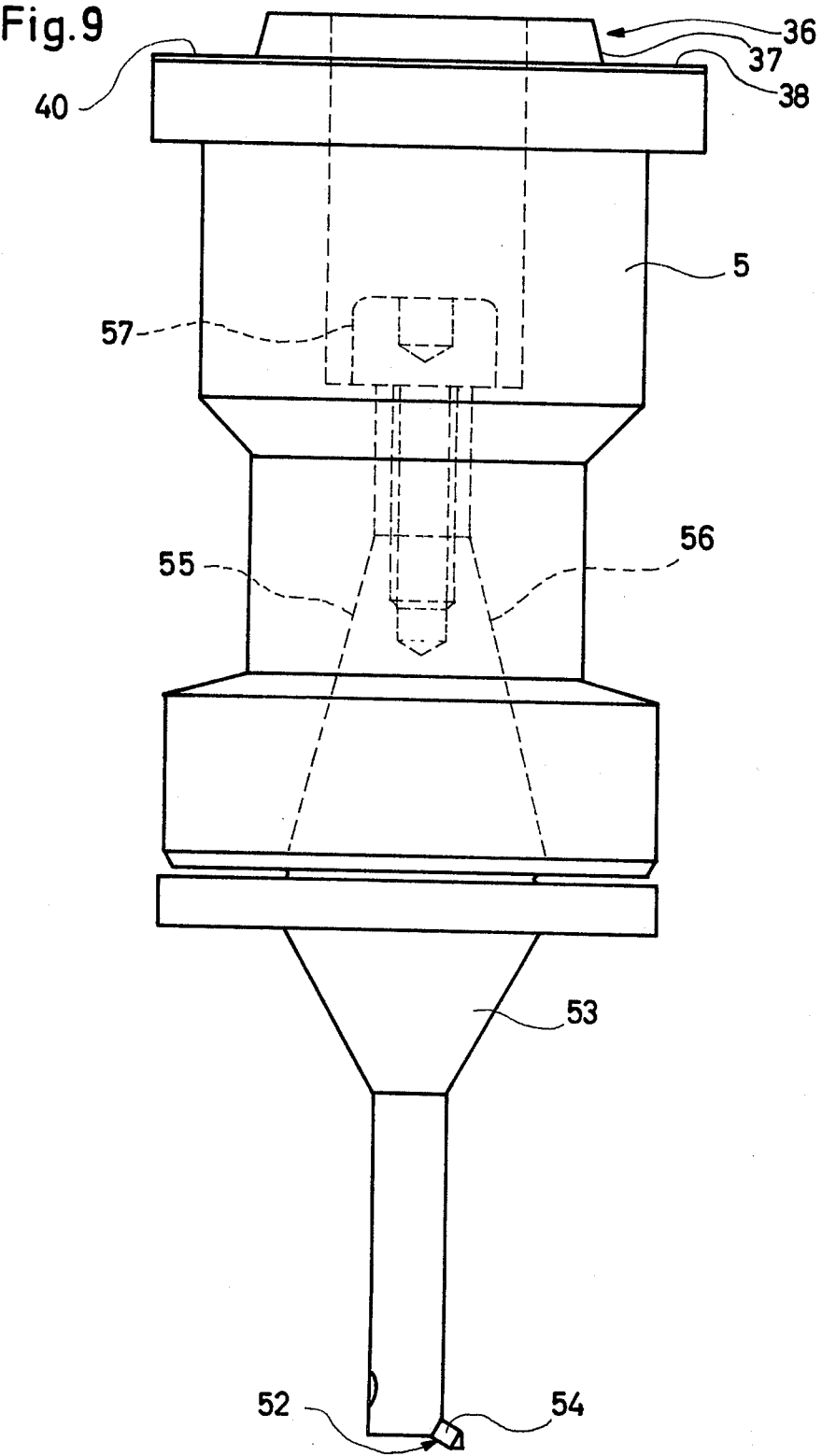
FIG. 9 is a side view of a tool carrier with a tool mounted thereon.
Figure 10:
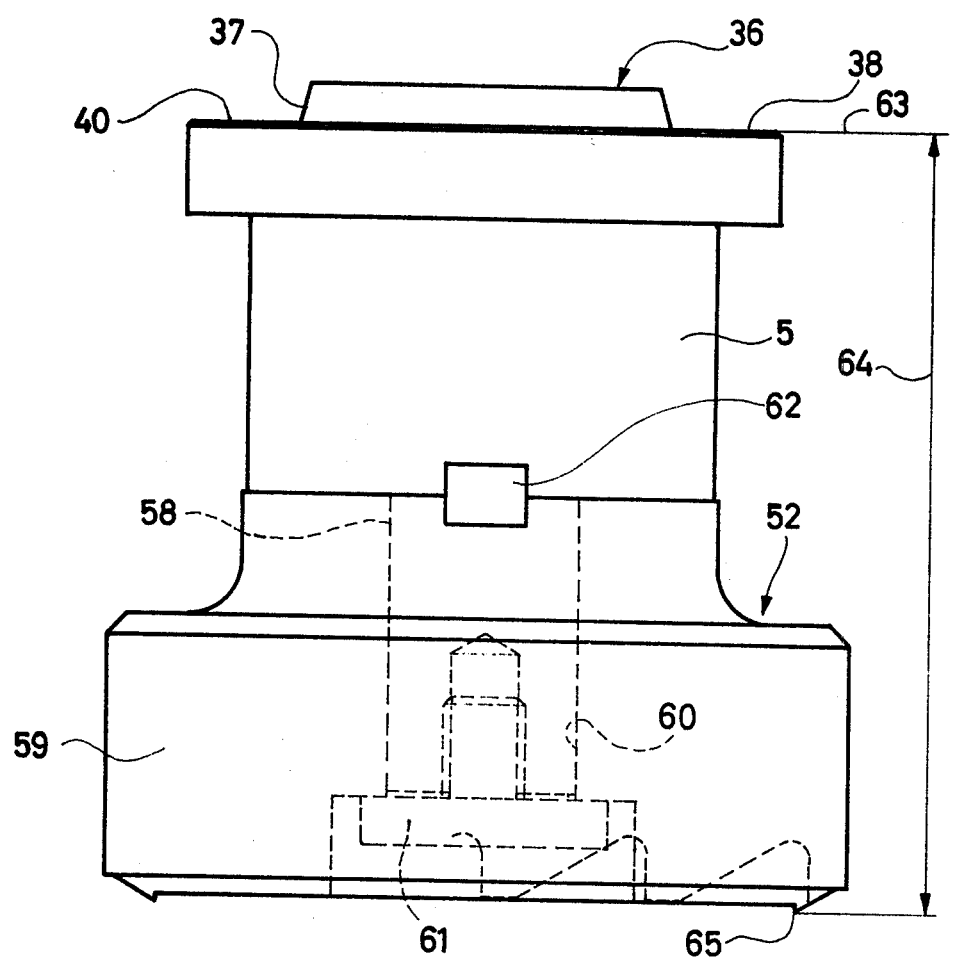
FIG. 10 is a side view of a tool carrier with another tool mounted thereon.

The upper parts of all tool carriers 5 are constructed in the same manner for reception in the magazine 4, respectively onto the holding member 11, but the lower parts of the various tool carriers may be constructed in a different manner for the reception of specific tools. Thus, FIG. 9 illustrates a tool carrier 5 to which a tool holder 53 with a tool 52 in form of a turning bit 54 is connected. For this purpose, the tool carrier 5 is provided with a steep internal cone 55, extending centrally from the lower surface of the tool carrier 5 into the latter, into which a corresponding cone 56 of the tool holder 53 is inserted and held by means of a screw 57 in the tool carrier. In the modification of a tool carrier as shown in FIG. 10, the tool carrier 5 carries at its lower end a bolt 58, onto which a tool 52 in form of a milling cutter 59 with a bore 60 is applied and held on the tool carrier by a screw 61. In this case a considerable turning moment can be transmitted from the tool carrier 5 to the tool 52 by a key 62. The abutment face 38 of the tool carrier 5 serves as starting face 63 from which the length of the unit, comprising the tool carrier 5, the tool holder 53 and the tools 52 is determined, so that in the assembled position of the tool with the spindle, the engaging point 65 of the tool 52 is exactly determined by the axial end position of the spindle 9, the length thereof, and the distance of the point 65 from the surface 63 and the necessary programming of the movement of the spindle carrier head 2 respectively the advance of the drive spindle, can be easily carried out. In this way a loss of time for any subsequent correction of the tool length is avoided and the idle time of the machine tool correspondingly reduced.

Figure 5:
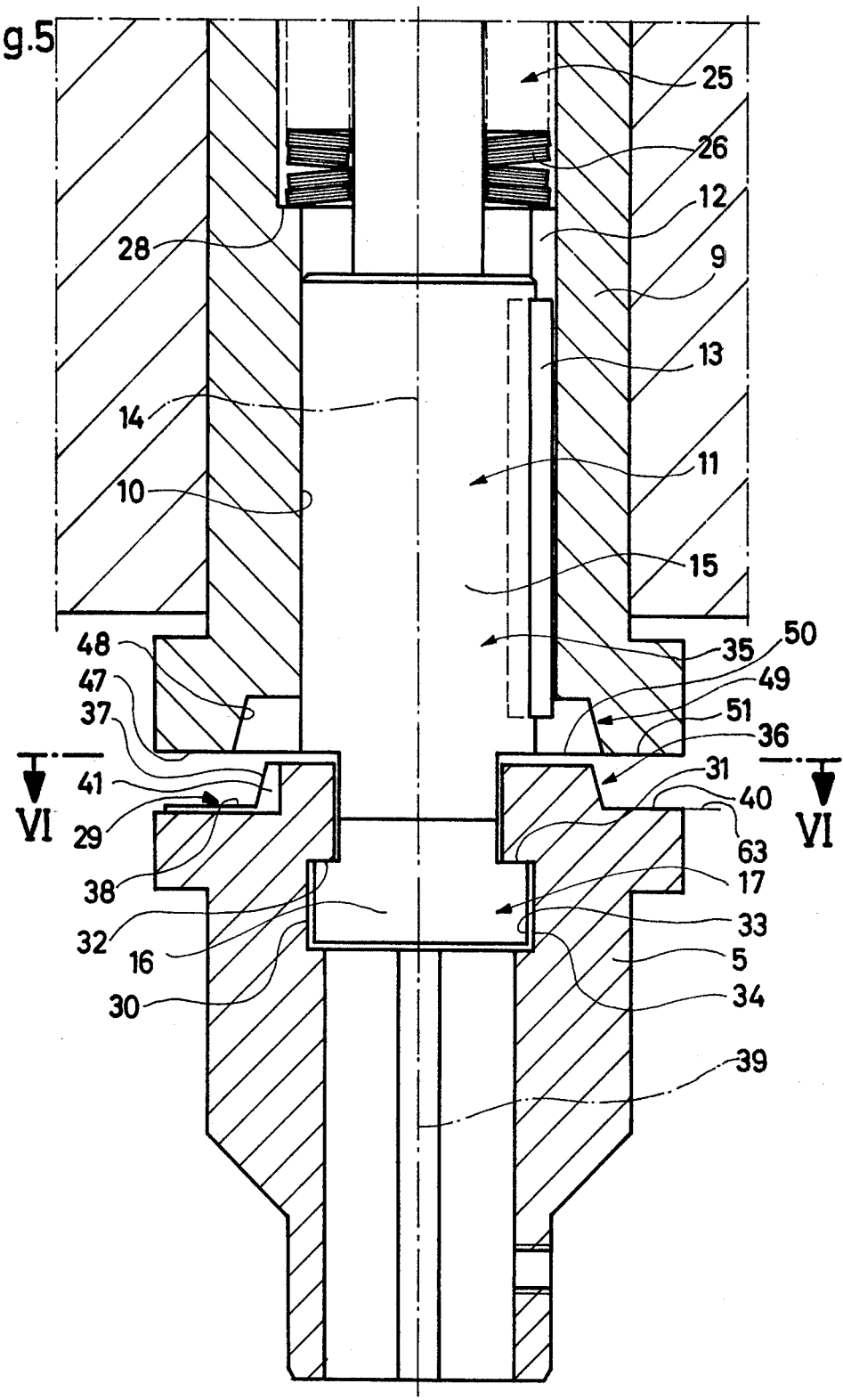
FIG. 5 is a cross section taken along the line V—V of FIG. 6.

Before the start of the machining operation, a tool carrier 5 with the desired tool 52 is brought by means of the transporting system to the working station 7, whereby the drive spindle 9, respectively the holding member 11 has the position as shown in FIG. 4, in which the crossbar 16 is axially and angularly aligned with the rail 6. The drive spindle 9 and the tool carrier have the position as shown in FIG. 5. By starting the fast advance of the spindle 9, by means of the electromotor 21 and the threaded spindle 22, the drive spindle 9 is moved in downward direction, but the holding member 11 remains still in the position as shown in FIG. 5 and the spring washer pack 26 partially expands. Subsequently thereto, the contact face 51 of the drive spindle 9 will abut against the contact face 38 of the tool carrier 5, hanging on the holding member 11, while the short cones 37 and 48 have still a small play with respect to each other. During further downward movement of the spindle 9, the holding member 11 is taken along and the upper end of the bolt-shaped extension 18 is thereby removed from the fixed abutment 19. The pretension of the energy storing means 25 will now act and move the holding member 11 and, over the abutment faces 31 and 32, the tool carrier 5 upwardly with a force corresponding to the pretension of the energy storing means. Since the contact faces 38 and 50 already abut against each other, this will cause spreading of the sectors 43–46 of the short cone 37 about elastic zones 66, so that a fully exact centralizing with the internal cone 48 will occur. The advance movement of the drive spindle is controlled in the usual manner until the machining of the workpiece is finished. Before fast return of the work spindle, the tool is disassociated from the workpiece by appropriate movement of the table 3 in connection with the arresting of the spindle 9 so that grooves on the workpiece during the return movement of the spindle are avoided. At the end of the return movement of the spindle, the extension 18 of the holding member 11 will abut the stationary abutment 19, while the upward movement of the spindle 9 proceeds during further operation of the electromotor 21, whereby the spring washer pack 27 is tensioned and the centralizing parts 36 and 49 are disassociated from each other, until the spindle stops in its predetermined end position in which the crossbar 16 of the receiving part 17 is again aligned with the rail 6 so that the tool carrier may be moved out of the working station 7 by the non-illustrated transporting system and a new tool 52 on another tool carrier may be placed on the holding member. Any idle time is thus avoided so that the change of a tool carrier can be carried out in the above-mentioned extremely short time.

While the present invention has been described in connection with an automatic tool changing arrangement, it is applicable also when the tool carrier is moved by hand onto the holding member 11 of the drive spindle 9. Thereby it is only necessary that the axes 14 and 39 are substantially aligned with each other and the precentralizing is then carried out by the short cones 37 and 48, whereas the exact centralizing is carried out by the spreading of the cone sectors 43–46.

It will be understood that each of the elements described above, or two or more together, may also find a useful application in other types of tool changing arrangements for machine tools differing from the types described above.

While the invention has been illustrated and described as embodied in a tool changing arrangement for a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A tool changing arrangement for a machine tool, comprising a rotary drive spindle movable in axial direction between two end positions; a tool holding member coaxially carried by said spindle for rotation therewith and axially movable with respect thereto, said tool holding member having a tool carrier receiving part projecting beyond one end of said spindle, said tool carrier receiving part comprising a cross bar extending transversely to the axis of said tool holding member; a tool carrier movable transversely to said holding member and having at one end facing said one end of said spindle a slot in which said cross bar is inserted for transmitting a turning movement from said spindle to said tool carrier; and centralizing portions at facing ends of said spindle and said tool carrier interengaging with each other during axial movement of said holding member relative to said spindle to axially align said tool carrier and said spindle.

2. A tool changing arrangement as described in claim 1, wherein said drive spindle has an axial bore in which said holding member is guided for movement in axial direction.

3. A tool changing arrangement as defined in claim 2, wherein said slot and said crossbar have faces extending transverse to the axes of said holding member and said tool carrier for transmitting axial forces between said holding member and said tool carrier.

4. A tool changing arrangement as defined in claim 3, wherein said slot and said part of said holding member have a T-shaped cross section.

5. A tool changing arrangement as defined in claim 2, and including a tongue-and-groove arrangement for connecting said holding member to said spindle for rotation therewith, and wherein said holding member has, with the exception of said crossbar and a portion adjacent thereto, a main portion of cylindrical cross section, said groove extending from the peripheral surface of said main portion into the latter.

6. A tool changing arrangement as defined in claim 1, and including means connected with said holding member for moving the axially facing ends of said drive spindle and said tool carrier in tight engagement with each other.

7. A tool changing arrangement as defined in claim 6, wherein said means comprise energy storing means between said drive spindle and said holding member, said energy storing means being arranged to change its characteristic during movement of said spindle and said holding member relative to each other.

8. A tool changing arrangement as defined in claim 7, and including stationary abutment means for limiting axial movement of said holding member in one direction relative to said drive spindle, said drive spindle having in one of its end positions a predetermined distance from said stationary abutment means, and including means connected to said drive spindle for moving the latter in a direction increasing said predetermined distance from said abutment means, said energy storing means being connected to said holding member to draw a face at one end of said tool carrier against a face at one end of said spindle upon disconnection of said holding member from said stationary abutment means.

9. A tool changing arrangement as defined in claim 7, wherein said energy storing means is constituted by a pack of dished spring washers held between said drive spindle and said holding member.

10. A tool changing arrangement as defined in claim 9, wherein said holding member has a bolt-shaped projection projecting opposite said tool carrier receiving part from said holding member and having a stop portion on the free end thereof, said pack of spring washers being arranged about said projection and abutting with opposite ends on said stop portion and on a shoulder of said spindle.

11. A tool changing arrangement as defined in claim 10, wherein said drive spindle is a tubular spindle and including stationary abutment means located opposite the other end of said drive spindle spaced therefrom, said bolt-shaped projection of said holding member extending through said tubular spindle and cooperating with said stationary abutment means.

12. A tool changing arrangement as defined in claim 1, wherein said centralizing portions on said drive spindle and said tool carrier are constituted by short interengaging cones.

13. A tool changing arrangement as defined in claim 12, wherein said drive spindle has an axial bore in which said holding member is guided for movement in axial direction and wherein the cone on said tool carrier is intersected by said slot.

14. A tool changing arrangement as defined in claim 12, wherein said cone on said tool carrier is provided with cutouts which divide said cone into a plurality of sectors.

15. A tool changing arrangement as defined in claim 14, wherein said tool carrier has elastic zones about which said sectors are spreadable when during movement of said drive spindle and said tool carrier relative to each other said contact faces on said drive spindle and said tool carrier abut against each other.

16. A tool changing arrangement as defined in claim 12, wherein said facing ends of said drive spindle and said tool carrier are, in addition to said short cones, provided with contact faces for transmitting forces in axial direction between said drive spindle and said tool carrier.

17. A tool changing arrangement as defined in claim 16, wherein said contact faces are annular faces respectively surrounding the bases of said cones and being located in planes normal to the axes of said drive spindle and said tool carrier.

18. A tool changing arrangement for a machine tool, comprising a rotary drive spindle movable in axial direction between two end positions; a tool holding member coaxially carried by said spindle for rotation therewith and axially movable with respect thereto, said tool holding member having a tool carrier receiving part projecting beyond one end of said spindle; a tool carrier movable transversely to said holding member and having at one end facing said one end of said spindle a portion in which said tool carrier receiving part is inserted, said spindle and said tool carrier having at facing ends interengaging centralizing portions which, during axial movement of said holding member relative to said spindle, axially align said tool carrier and said spindle, said portion of said tool carrier having faces cooperating with and engaging faces of said receiving part of said holding member when said part of said holding member is inserted into said portion, for transmitting a turning moment from said spindle to said tool carrier; and a magazine having a rail on which a plurality of tool carriers with a tool thereon are movable along an endless path, said spindle intersecting said path and said rail having a first interruption at the point of intersection of said spindle with said path and a second interruption for placing said tool carriers on said rail, said spindle and said holding member carried thereby are arrestable in one axial end position in which said tool carrier receiving part of said holding member is aligned with said rail.

19. A tool changing arrangement as defined in claim 18, wherein said facing ends of said drive spindle and said tool carrier are, in addition to said centralizing portions, provided with contact faces for transmitting forces in axial direction between said drive spindle and said tool carrier, and including a tool holder and a tool carried by said tool carrier and forming with the latter a unit, and wherein said contact face of said tool carrier serves to determine the axial position of the unit relative to said drive spindle.

20. A tool changing arrangement as defined in claim 18, wherein said drive spindle has an axial bore in which said holding member is guided for movement in axial direction, wherein said tool carrier receiving part of said holding member comprises a crossbar extending transversely to the axis of said holding member, wherein said portion of said tool carrier is provided with a slot for receiving said crossbar, wherein said rail forms a circular path and has a profile corresponding to that of said crossbar, and wherein said crossbar is curved corresponding to said circular path.

21. A tool changing arrangement for a machine tool, comprising a rotary drive spindle movable in axial direction between two end positions; a tool holding member coaxially carried by said spindle for rotation therewith and axially movable with respect thereto, said tool holding member having a tool carrier receiving part projecting beyond one end of said spindle; a tool carrier movable transversely to said holding member and having at one end facing said one end of said spindle a portion in which said tool carrier receiving part is inserted, said spindle and said tool carrier having at facing ends interengaging centralizing portions which, during axial movement of said holding member relative to said spindle, axially align said tool carrier and said spindle, said portion of said tool carrier having faces cooperating with and engaging faces of said receiving part of said holding member, when said part of said holding member is inserted into said portion, for transmitting a turning moment from said spindle to said tool carrier; and stationary abutment means for limiting axial movement of said holding member in one direction relative to said spindle, said spindle in one of its end positions having a predetermined distance from said stationary abutment means.

* * * * *